(12) United States Patent  
Enomoto et al.

(10) Patent No.: US 9,120,694 B2  
(45) Date of Patent: Sep. 1, 2015

(54) GLASS PREFORM HEATING FURNACE

(75) Inventors: Tadashi Enomoto, Yokohama (JP); Iwao Okazaki, Yokohama (JP); Takashi Yamazaki, Yokohama (JP); Masatoshi Hayakawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/129,673

(22) PCT Filed: Jun. 13, 2012

(86) PCT No.: PCT/JP2012/065119  
§ 371 (c)(1),  
(2), (4) Date: Mar. 25, 2014

(87) PCT Pub. No.: WO2013/002028  
PCT Pub. Date: Jan. 3, 2013

(65) Prior Publication Data  
US 2014/0196505 A1  Jul. 17, 2014

(30) Foreign Application Priority Data  
Jun. 29, 2011 (JP) ................................. 2011-143964

(51) Int. Cl.  
*C03B 37/029* (2006.01)  
*H05B 3/62* (2006.01)  
(Continued)

(52) U.S. Cl.  
CPC ......... *C03B 37/029* (2013.01); *C03B 37/01257* (2013.01); *F27B 17/00* (2013.01); *H05B 3/62* (2013.01); *C03B 2205/63* (2013.01); *H05B 2203/025* (2013.01)

(58) Field of Classification Search  
USPC .................. 65/509, 537, 374.1; 219/541, 553  
See application file for complete search history.

(56) References Cited

U.S. PATENT DOCUMENTS 4,410,796 A * 10/1983 Wilsey ........................... 117/210  
4,467,185 A    8/1984 Moritoki et al.  
4,547,644 A * 10/1985 Bair et al. ...................... 219/634  
(Continued)

FOREIGN PATENT DOCUMENTS

CN       1148033 A      4/1997  
CN       1211719 A      3/1999  
(Continued)

OTHER PUBLICATIONS

Office Action issed May 6, 2015 in corresponding Chinese Patent Application No. 201280032793.4 (7 pages) and English Translation (9 pages).

*Primary Examiner* — Mark Halpern  
(74) *Attorney, Agent, or Firm* — Drinker Biddle & Reath LLP (57) ABSTRACT

The present invention provides a glass preform heating furnace in which the occurrence of arching is suppressed. The glass preform heating furnace is equipped with a susceptor (3); a slit heater (4); an insulator; and a furnace body, wherein, in the case that the space between the slit heater (4) and the susceptor or between the slit heater (4) and the conductive member closest to the slit heater is D, that the maximum value of the electric field in this space is E1, that the number of the slits in the slit heater is N, that the slit width of the slit heater is S, and that the maximum value of the electric field in the slit space is E2, the values of D, N and S are set so that $E1 \geq E2$ is established.

7 Claims, 7 Drawing Sheets

(51) Int. Cl.
   *F27B 17/00*   (2006.01)
   *C03B 37/012*   (2006.01)

(56) References Cited

U.S. PATENT DOCUMENTS

| | | | | |
|---|---|---|---|---|
| 4,549,345 | A | * | 10/1985 | Wilsey .............................. 29/611 |
| 4,578,098 | A | * | 3/1986 | Paek et al. ........................ 65/510 |
| 4,755,658 | A | * | 7/1988 | Wilsey ........................... 219/541 |
| 5,660,752 | A | | 8/1997 | Vilzmann |
| 6,546,760 | B1 | | 4/2003 | Tsuchiya et al. |
| 2005/0120547 | A1 | | 6/2005 | Bommier |

FOREIGN PATENT DOCUMENTS

| | | |
|---|---|---|
| CN | 1675134 A | 9/2005 |
| CN | 202201823 U | 4/2012 |
| EP | 0 752 393 A1 | 1/1997 |
| JP | 08-059277 A | 3/1996 |
| JP | H09-71433 A | 3/1997 |
| JP | 2000-063135 A | 2/2000 |
| JP | 3377131 B2 | 2/2003 |
| JP | 2004-224587 A | 8/2004 |
| JP | 2010-168234 A | 8/2010 |

* cited by examiner

(A)
(EQUIPOTENTIAL LINES OF
ELECTRIC FIELD AT POSITION L)

(B)
(EQUIPOTENTIAL LINES OF
ELECTRIC FIELD AT POSITION H)

GLASS PREFORM HEATING FURNACE

This application is a 371 of PCT/JP2012/065119 filed 13 Jun. 2012.

TECHNICAL FIELD

The present invention relates to a glass preform heating furnace for heating a glass preform so that the preform can be stretched, drawn, etc.

BACKGROUND ART

A glass preform heating furnace will be described by taking an optical fiber drawing furnace as an example. As described in Patent Document 1 (refer to FIG. 1), in the optical fiber drawing furnace, the lower section of an optical fiber preform 2 being suspended and supported is heated, an optical fiber 2a is melted and allowed to droop from the lower end of the lower section having been made smaller in diameter by the heating and melting, and the optical fiber 2a is drawn so as to have a predetermined outer diameter. A drawing furnace 1 for this purpose is configured such that a cylindrical heater 4 for heating is disposed so as to enclose a susceptor 3 into which the preform 2 is supplied, such that the cylindrical heater 4 is enclosed with an insulator 5 so that the heat of the cylindrical heater 4 is not dissipated to the outside, and such that the entire exterior thereof is enclosed with a furnace body 6.

The furnace body 6 is made of a metal being superior in corrosion resistance, such as stainless steel; in addition to the insulator 5 provided to prevent the temperature of the furnace body from rising due to the heat of the cylindrical heater 4, a cooling water passage or the like is provided so that the furnace body can be cooled. With this configuration, the furnace body 6 can be maintained in a state in which dimensional changes due to thermal expansion are practically negligible even during operation. Furthermore, an inert gas or the like, such as helium (He) gas, argon (Ar) gas, or nitrogen ($N_2$) gas, is supplied into the furnace body 6 to prevent carbon components, such as the cylindrical heater 4 and the insulator 5, from being degraded due to oxidation.

The cylindrical heater 4 is formed, for example, as a slit heater having a heating section 8 meandering in the vertical direction that is formed by cutting slits 7 in a cylindrical member made of a carbon electrical resistance member from the upper and lower ends thereof alternately, and has at least a pair of terminal sections 9a and 9b for power supply at one end section. The pair of terminal sections 9a and 9b is provided at opposite positions 180 degrees apart and installed so as to be electrically and mechanically connected to a power supply section 10 that is supported by and secured to the furnace body 6.

PRIOR ART DOCUMENT

Patent Document

Patent Document 1
JP-3377131-B

GENERAL DESCRIPTION OF THE INVENTION

Problem that the Invention is to Solve

In the above-mentioned drawing furnace, when the power (voltage) applied to the cylindrical heater (hereafter referred to as a slit heater) 4 is raised so that the furnace is heated to a predetermined heating temperature, arching may occur between the susceptor 3 and the slit heater 4 or between the slit heater 4 and the conductive member closest to the slit heater. It is known that the arching is liable to occur in particular when Ar gas is used as an inert gas or the like to be supplied into the furnace body 6; however, even when He gas is used, a similar arching occurs when the power (voltage) is raised. Once arching occurs, electricity flows to a discharge path, eventually not flowing properly to the slit heater, whereby heating and temperature rising are hindered and optical fiber drawing cannot be carried out. In addition, the furnace may be damaged by overcurrent due to the arching.

In consideration of the above-mentioned actual circumstances, the present invention is intended to provide a glass preform heating furnace in which the occurrence of arching is suppressed between the susceptor and the slit heater thereof.

Means for Solving the Problem

According to the present invention, there is provided a glass preform heating furnace including: a susceptor to which a glass preform is supplied; a slit heater in which slits are cut in a cylindrical member enclosing the susceptor from the upper and lower ends of the cylindrical member alternately; an insulator enclosing the exterior of the slit heater; and a furnace body enclosing the whole, wherein, in the case that the space between the slit heater and the susceptor or between the slit heater and the conductive member closest to the slit heater is D, that the maximum value of the electric field in this space is E1, that the number of the slits in the slit heater is N, that the slit width of the slit heater is S, and that the maximum value of the electric field in the slit space is E2, the values D, N and S are set so that E1≥E2 is established.

In the case that the above-mentioned slit heater is a single-phase slit heater, the slit width S of the slit heater is set to 8×(D/N) or more, and in the case that the slit heater is a three-phase slit heater, the slit width S of the slit heater is set to 9×(D/N) or more, preferably 12×(D/N) or more.

The slit width S of the slit heater may merely be satisfied at least in the slits adjacent to the terminal sections of the slit heater. Furthermore, the above-mentioned glass preform heating furnace operates more effectively in the case that argon gas or nitrogen gas is supplied into the furnace body.

Advantage of the Invention

With the present invention, in the case that the size of the slit heater, the space between the susceptor and the slit heater, etc. are set beforehand because of the size of a glass preform, for example, the configuration of the furnace is simply changed by merely increasing the slit width of the slit heater, whereby the occurrence of arching between the slit heater and the susceptor or between the slit heater and the conductive member closest to the slit heater can be suppressed effectively.

MODE FOR CARRYING OUT THE INVENTION

Figure 1:
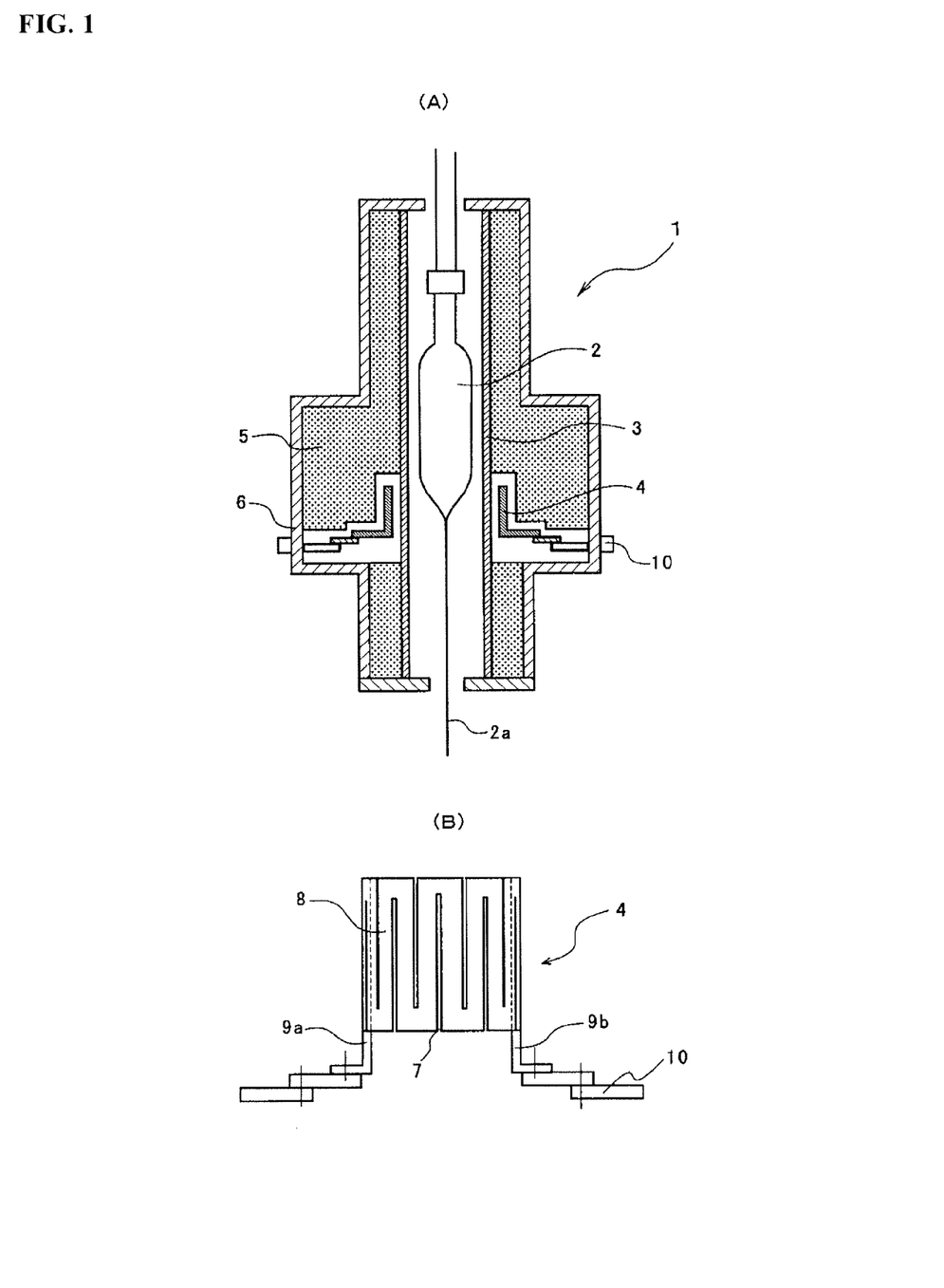
FIG. 1 is a view illustrating an outline of an optical fiber drawing furnace serving as an example of an embodiment according to the present invention.

An embodiment according to the present invention will be described referring to the drawings. In the following description, although a single-phase slit heater is mainly taken as an example and described, a three-phase slit heater has the same structure as that of the single-phase slit heater, except for the arrangement positions of electrode sections, and the heater itself is disposed at the same position of the heating furnace. FIG. 1(A) is a view illustrating an example of an optical fiber drawing furnace for use in the present invention, and FIG. 1(B) is a view showing an example of a slit heater. In the figures, numeral 1 designates an optical fiber drawing furnace, numeral 2 designates an optical fiber preform, numeral 2a designates an optical fiber, numeral 3 designates a susceptor, numeral 4 designates a slit heater, numeral 5 designates an insulator, numeral 6 designates a furnace body, numeral 7 designates a slit, numeral 8 designates a heating section, numerals 9a and 9b designate terminal sections, and numeral 10 designates a power supply section.

Optical fiber drawing is carried out as shown in FIG. 1(A) by using a process in which the lower section of the preform 2 being suspended and supported is heated, the optical fiber 2a is melted and allowed to droop from the lower end of the lower section having been made smaller in diameter by the heating and melting, and the optical fiber 2a is drawn so as to have a predetermined outer diameter. The optical fiber drawing furnace 1 for this purpose is configured such that the slit heater 4 having a cylindrical shape and made of a carbon resistance member for heating is disposed so as to enclose the susceptor 3 into which the preform 2 is supplied, such that the slit heater 4 is enclosed with the insulator 5 so that the heat of the slit heater 4 is not dissipated to the outside, and such that the entire exterior thereof is enclosed with the furnace body 6.

The preform 2 is suspended and supported by a preform supply mechanism (not shown) and is controlled so as to be moved sequentially downward as optical fiber drawing proceeds. The furnace body 6 is made of a metal being superior in corrosion resistance, such as stainless steel, and the susceptor 3 having a cylindrical shape and made of high purity carbon, for example, is disposed in the central area thereof. In addition to the insulator 5 provided to prevent the temperature of the furnace body 6 from rising due to the heat of the slit heater 4, a cooling water passage or the like, not shown, is provided so that the furnace body 6 can be cooled. With this configuration, the furnace body 6 can be maintained in a state in which dimensional changes due to thermal expansion are practically negligible. Furthermore, an inert gas or the like, such as Ar gas, $N_2$ gas or He gas, is supplied into the furnace body 6 to prevent the slit heater 4 and the insulator 5 from being degraded due to oxidation.

The slit heater 4 is formed into a cylindrical shape having the heating section 8 meandering in the vertical direction that is formed by cutting the slits 7 in a cylindrical member made of a carbon electrical resistance member from the upper and lower ends thereof alternately as shown in FIG. 1(B), although the details will be detailed later. In the case of the slit heater for single-phase use, at least a pair of terminal sections 9a and 9b is provided for power supply at opposite positions 180 degrees apart at one end section (the lower end section in this embodiment) of the slit heater 4 and connected and secured to the power supply section 10 provided for the furnace body 6 via insulators. In other words, the power supply section 10 has a function of securing and supporting the slit heater 4 in addition to a function of supplying power to the slit heater 4. In the case of the slit heater for three-phase use, the above-mentioned terminal sections are provided at three positions 120 degrees apart from one another (connected in a three-phase delta connection).

The present invention is characterized by the configuration of the slit heater 4 of the above-mentioned optical fiber drawing furnace 1, and the details thereof are described below referring to FIG. 2 and the following figures. FIG. 2(A) is a perspective view showing the slit heater for single-phase use, broken away on line X-X of FIG. 2(B), FIG. 2(B) is a view showing the slit heater viewed from above, and FIG. 2(C) is a view showing an example of the slit heater for three-phase use. FIG. 3 is a magnified view showing the terminal section shown in FIGS. 2(B) and 2(C).

The outline of the slit heater 4 has been described referring to FIG. 1(B); in the case that the space between the slit heater 4 and the susceptor 3 or between the slit heater 4 and the conductive member closest to the slit heater is D, that the maximum value of the electric field in this space is E1, that the number of the slits in the slit heater is N, that the slit width of the slit heater is S, and that the maximum value of the electric field in the slit space is E2, the present invention is characterized in that the values of the above-mentioned D, N and S are set so that E1≥E2 is established. In the case that the slit heater is a single-phase slit heater, the width S of the slit 7 is set to 8×(D/N) or more, and in the case that the slit heater is a three-phase slit heater, the width S of the slit 7 is set to 9×(D/N) or more, preferably 12×(D/N) or more, as described later.

The susceptor is usually the conductive member closest to the slit heater and D is usually the distance between the susceptor and the slit heater; hence, the following description is given assuming that the distance to the susceptor is D. In addition, it is assumed that the number N of the slits described herein is the total number of the slits having been cut alternately in the slit heater 4.

Furthermore, arching occurring between the slit heater 4 and the susceptor 3 or between the slit heater 4 and the conductive member closest to the slit heater occurs mostly in the regions designated by M and located adjacent to the terminal sections 9a to 9c; hence, it is preferable that the slits adjacent to the terminal sections, for example, the slits 7b cut from below on both sides of each of the terminal sections 9a to 9c, are configured so as to satisfy the above-mentioned conditions.

Figure 2:
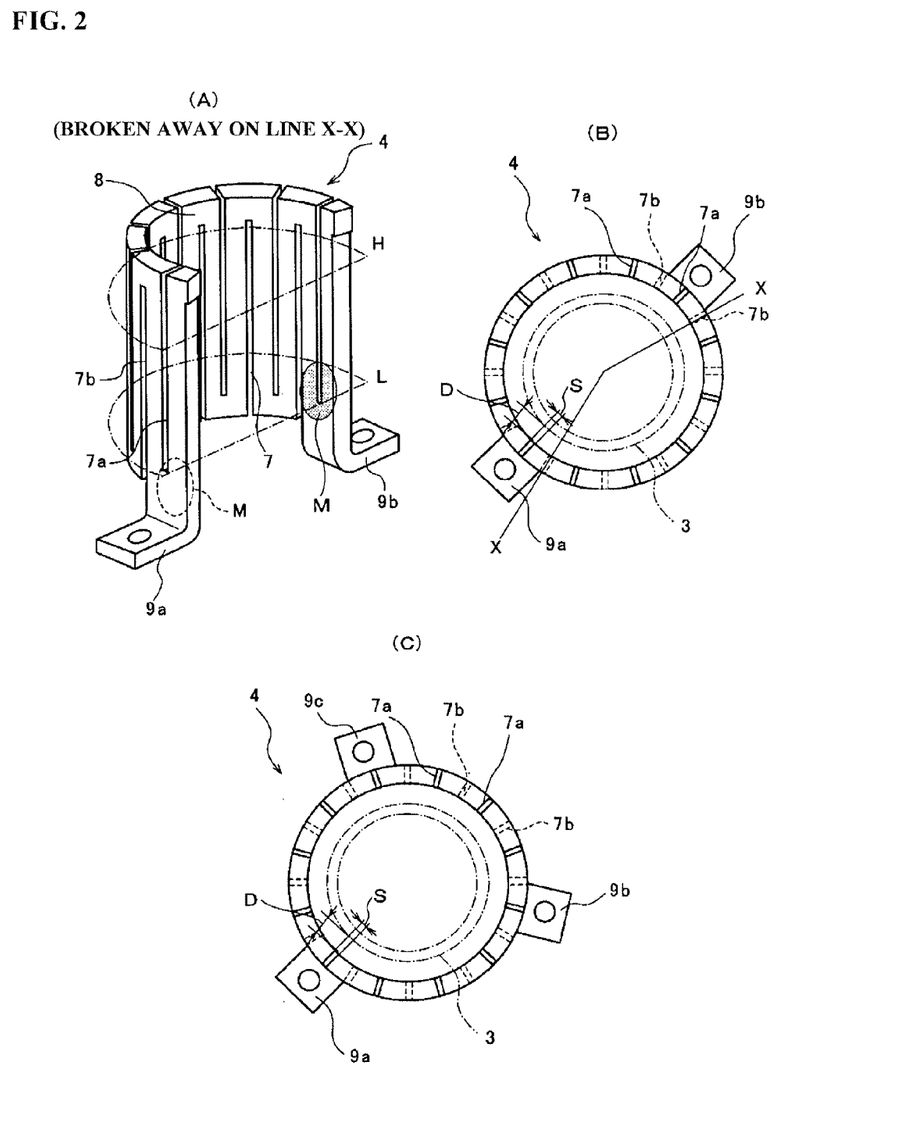
FIG. 2 is a view illustrating a slit heater according to the present invention.
Figure 3:
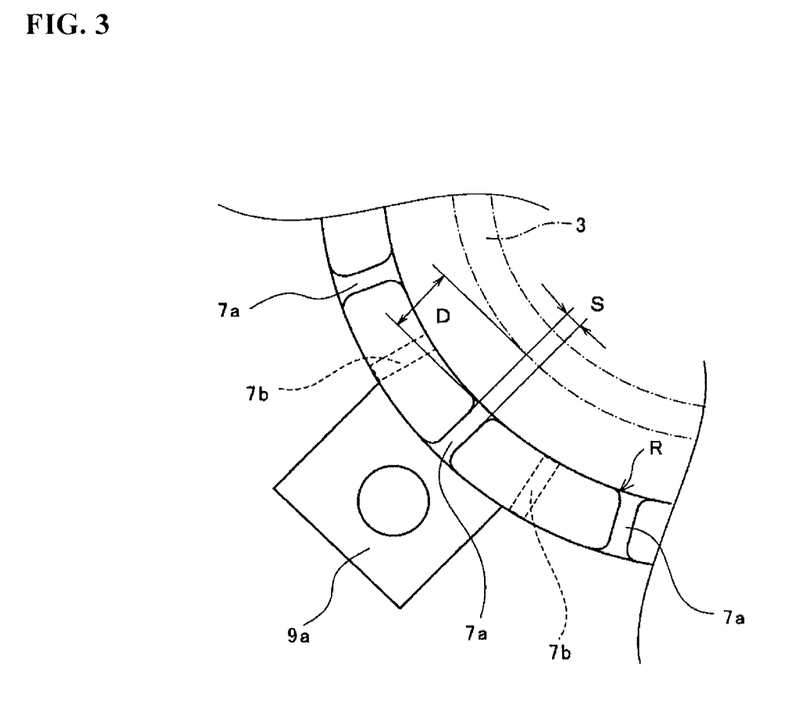
FIG. 3 is a magnified view showing the terminal section shown in FIG. 2.

First, the single-phase slit heater shown in FIGS. 2(A) and 2(B) is described. The slits 7 are formed by cutting the slits 7a from the upper end of the heating section 8 and by cutting the slits 7b from the lower end thereof alternately, whereby a predetermined resistance length meandering in the vertical direction can be obtained. The terminal sections 9a and 9b are formed, for example, on the lower end sides of the slits 7a having been cut from the upper end, and the ungrounded potential wires at both ends of a single-phase three-wire power source are connected to the terminal sections on both sides. Furthermore, since zero potential is usually applied to the susceptor 3, an electric field is generated due to the potential difference between the susceptor 3 and the slit heater 4. In the slit heater 4, the potential becomes highest at one of the terminal sections 9a and 9b and becomes lowest at the other; hence, the potential difference from the susceptor 3 becomes largest at the terminal sections 9a and 9b.

Moreover, since the slit heater 4 is a resistance member and a voltage drop occurs in the meandering lengthwise direction thereof, an electric field is also generated in the space facing the slit edges (in the slit space). When the generation state of the electric field in the slit space and the generation state of the electric field between the slit heater and the susceptor are examined, the mode at the lower position L (for example, the ¼ position of the height of the heater) of the slit heater 4 shown in FIG. 2(A) is different from the mode at the upper position H (for example, the ¾ position of the height of the heater) thereof.

Figure 4:
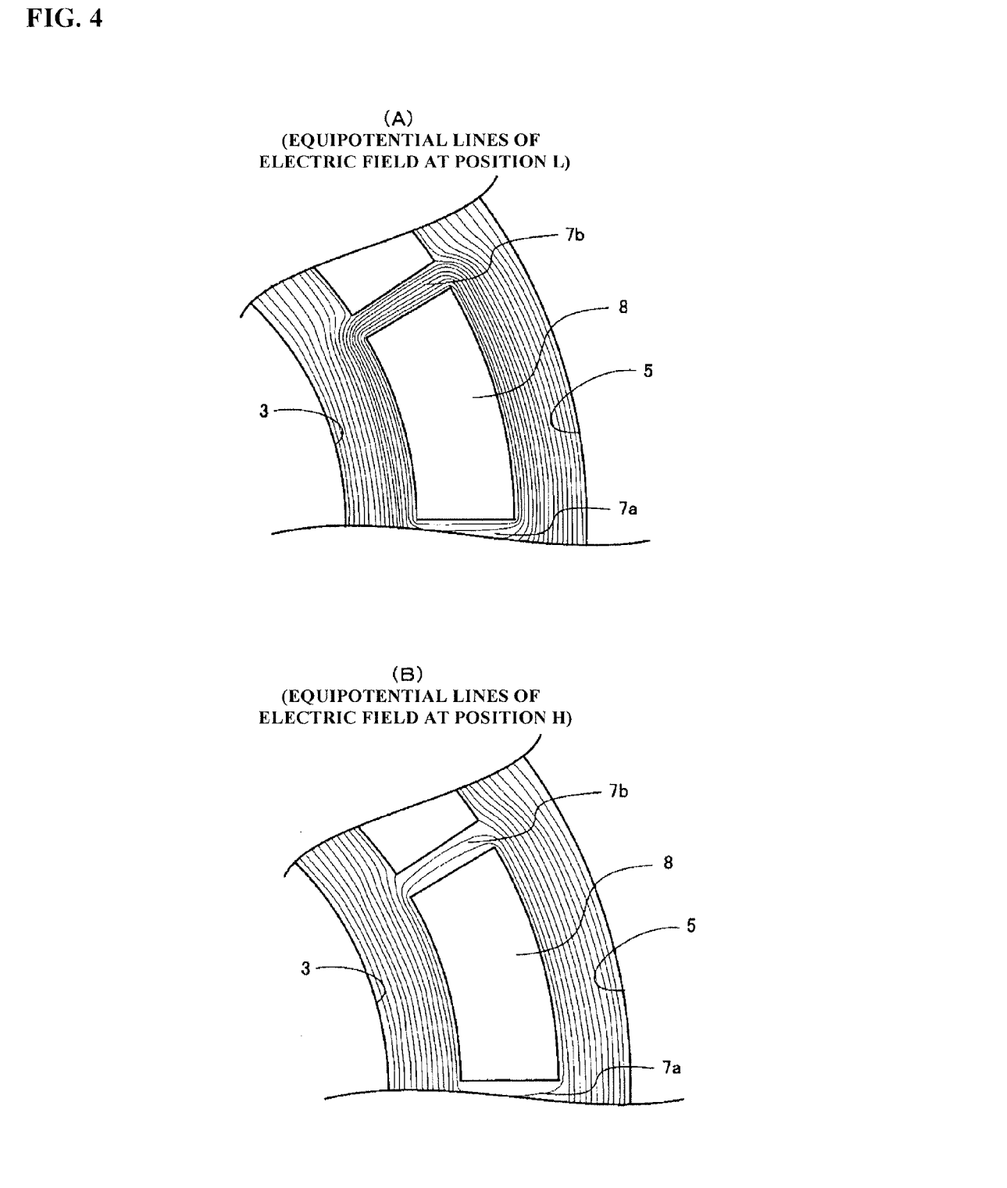
FIG. 4 is a view illustrating electric field strength at the time when power is supplied to the slit heater.

FIG. 4 shows the equipotential lines of the electric field at the slit 7b adjacent to the high-potential side terminal section at the time when the maximum potential is applied; FIG. 4(A) shows the state of the electric field at the lower position L of the slit heater 4, and FIG. 4(B) shows the state of the electric field at the upper position H of the slit heater 4.

As indicated by these equipotential lines, it is found that the electric field strength in the slit 7b at the lower position L of the slit heater 4 is larger than the electric field strength in the slit 7b at the upper position H thereof (the equipotential lines are denser) and that the electric field strength in the slit 7b at the upper position H is smaller (the equipotential lines are sparser). The reason why the electric field strength at the lower position L becomes larger as described above is that the potential difference in the slit heater in the space facing the slit edges becomes largest at the lower position (adjacent to the terminal section) in the case that the slit is cut from the lower end.

Since the potential difference between the slit heater and the susceptor becomes largest in the neighborhood of the terminal sections 9a and 9b as described above, the electric field strength become largest in the neighborhood of the terminal sections 9a and 9b in the case that the strength is considered in the circumferential direction of the slit heater. Since the electric field strength in the slit space and the electric field strength between the slit and the susceptor become largest in the neighborhood of the terminal sections 9a and 9b, it may be said that arching is liable to occur in the neighborhood of the terminal sections 9a and 9b. Hence, in particular in the case that the slit width S of the slit 7 in the neighborhood of the terminal is increased (widened), the electric field strength in the slit space is weakened so that arching hardly occurs, whereby the occurrence of arching to the susceptor can be reduced. Furthermore, since the electric field strength at the corner sections of the slit 7 becomes highest, it is effective and preferable that a round R (refer to FIG. 3) should be formed at the corner sections of the slit 7 to release the electric field strength.

Moreover, since the electric field strength between the susceptor 3 and the slit heater 4 decreases as the distance from the terminal sections 9a and 9b increases, arching hardly occurs at portions other than the terminal sections 9a and 9b (if arching does not occur in the neighborhood of the terminal sections, arching does not occur at the other portions). For this reason, the occurrence of arching can be reduced by widening the slit width S of the slits in the neighborhood of the terminal sections 9a and 9b. However, if only the slit width of some of the slits is widened, the uniformity of the resistance heating using the cylindrical slit heater may be impaired in some cases. Hence, with respect to the heating characteristic, it is favorable that all the slits have a uniform width.

What's more, since the electric field strength in the slit space becomes largest on the opening end side of the slit, the slit may have a shape having a widened slit width on the opening end side, that is, a tapered shape (V-shape).

Figure 5:
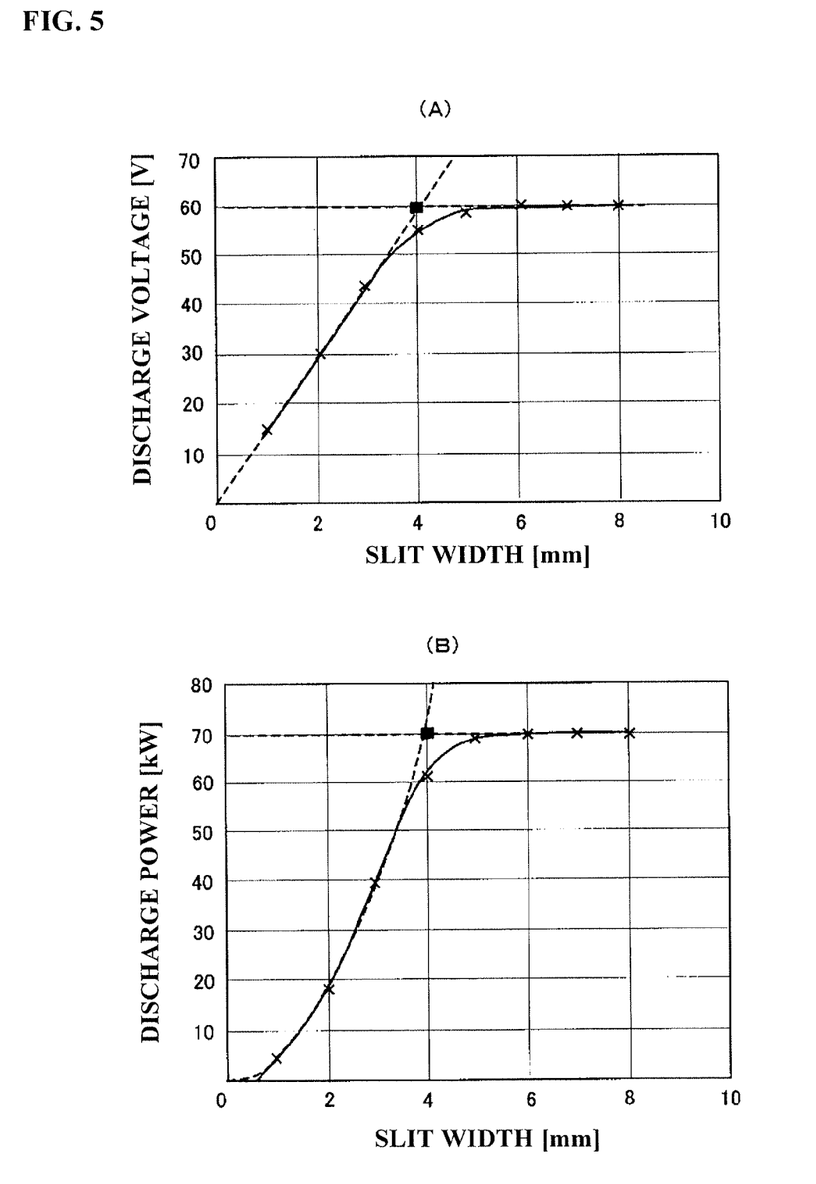
FIG. 5 is a graph showing the relationship between the slit width of single-phase slit heater and discharge voltage and the relationship between the slit width and discharge power.

FIG. 5 is a graph showing the result of an arching test to measure the voltage and power supplied between the terminal sections at the time of occurrence of arching between the susceptor and the single-phase slit heater. The test was conducted by changing the slit width S in the drawing of an optical fiber preform so as to have an outer diameter of 120 mm, with a drawing furnace in which the space D between the susceptor and the single-phase slit heater was 10 mm and the number N of the slits of the slit heater was 20 susceptor. Ar gas was used as the gas to be supplied into the furnace body.

FIG. 5(A) shows the relationship between the width of the slit and the discharge voltage at which arching occurs; in the case that the slit width is 4 mm or less, the relationship is represented by a linear function (in the dotted line portion), and it is found that the discharge voltage is proportional to the slit width. FIG. 5(B) shows the relationship between the slit width and the discharge power at which arching occurs; in the case that the slit width is 4 mm or less, the relationship is represented by a quadratic function (in the dotted line portion), and it is found that the discharge power increases as the quadratic function with respect to the slit width. In both cases, in the case that the slit width is 4 mm or more, the discharge voltage and the discharge power hardly increase even if the slit width is made larger. The threshold value (4 mm in this case) of the slit width varies depending on the space D between the susceptor and the slit heater, the number N of the slits, the type of gas, etc.; in the case that the slit heater is a single-phase slit heater and the gas supplied into the furnace is Ar gas, the slit width S to be used as the threshold value is $8 \times (D/N)$. Stable optical fiber drawing can be carried out by setting the slit width to this threshold value or more.

The reason why the threshold value has the above-mentioned value can be explained as described below.

Figure 7:
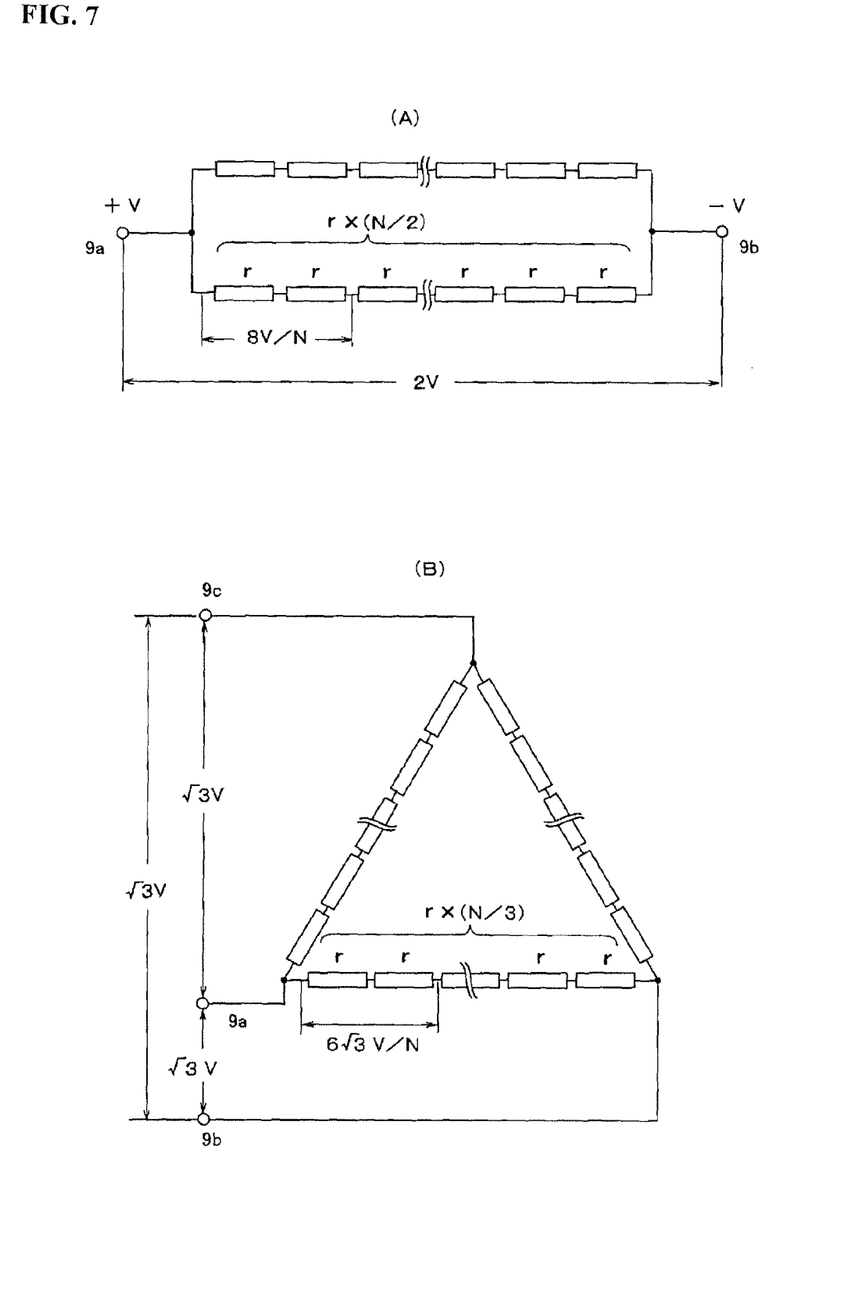
FIG. 7 is a simulation circuit diagram illustrating the state of the voltage applied to the slit heater.

FIG. 7(A) is a simulation view showing the resistance circuit of a single-phase slit heater. When it is assumed that resistance elements r are portions divided by the number N of the slits, a configuration in which two resistors, each formed of a series connection of resistance elements $r \times (N/2)$, are connected in parallel is formed between the two terminal sections 9a and 9b. When it is assumed that the potentials on both end sides of a single-phase three-wire system power source in which the voltage to ground is V are a plus potential and a minus potential, the voltage applied between the terminal sections 9a and 9b is "2 V." Hence, since the voltage (potential difference) in the slit space across the two adjacent resistance elements has a divided voltage value for two resistance elements, the voltage is "$2V \times [2r/r(N/2)] = 8 V/N$. When it is assumed that the slit width is S, the electric field ($E_2$) in the slit space is $(8 V/N)/S$.

On the other hand, since the conductive member (including the susceptor) closest to the slit heater has zero potential, an electric field ($E_1$) of V/D is generated between (in the space D between) the slit heater and conductive member closest thereto.

In order that the arching between the slit heater and the conductive member closest thereto is not affected by the structure of the slit, $E_1 \geq E_2$ may merely be established; in other words, $V/D \geq (8 V/N)/S \rightarrow "S \geq 8 D/N"$ is obtained.

According to the measurement result shown in FIG. 5. in the case of the drawing furnace in which the space D between the susceptor and the single-phase slit heater was 10 mm, the number N of the slits of the slit heater was 20, and Ar gas was used as the gas supplied into the furnace and when it is assumed that the slit width S of the slit heater is set to 3 mm, for example, arching occurs at a discharge voltage of approximately 45 V or at a discharge power of approximately 40 kW; it is thus found that heating cannot be performed up to the temperature at which optical fiber drawing can be carried out. However, when it is assumed that the slit width S of the slit heater is set to 5 mm, for example, arching does not occur even at a discharge voltage of 50 V or at a discharge power of 60 kW, heating can be performed up to the temperature at which optical fiber drawing can be carried out, whereby optical fiber drawing can be carried out satisfactorily.

Next, a three-phase slit heater will be described. The three-phase slit heater is similar to the single-phase slit heater and is, for example, the same as the single-phase slit heater in that the potential difference from the susceptor becomes the maximum at the terminal sections and that the electric field in the slit space on the opening end side of the slit becomes highest; hence, descriptions overlapping with those of the single-phase three-wire system are omitted.

As shown in FIG. 2(C), the three-phase slit heater is similar to the single-phase slit heater except that the three terminal sections 9a, 9b and 9c are provided at 120 degrees intervals; the slit heater has a predetermined resistance length meandering in the vertical direction that is formed by cutting the slits 7a from above and by cutting the slits 7b from below alternately. Furthermore, when it is assumed that zero potential is applied to the susceptor 3, an electric field due to the potential difference is generated between the susceptor 3 and the slit heater 4. In the three-phase slit heater 4, the highest potential is obtained at one of the terminal sections 9a, 9b and 9c, and the largest potential difference is obtained between the terminal section having the highest potential and the susceptor 3.

Figure 6:
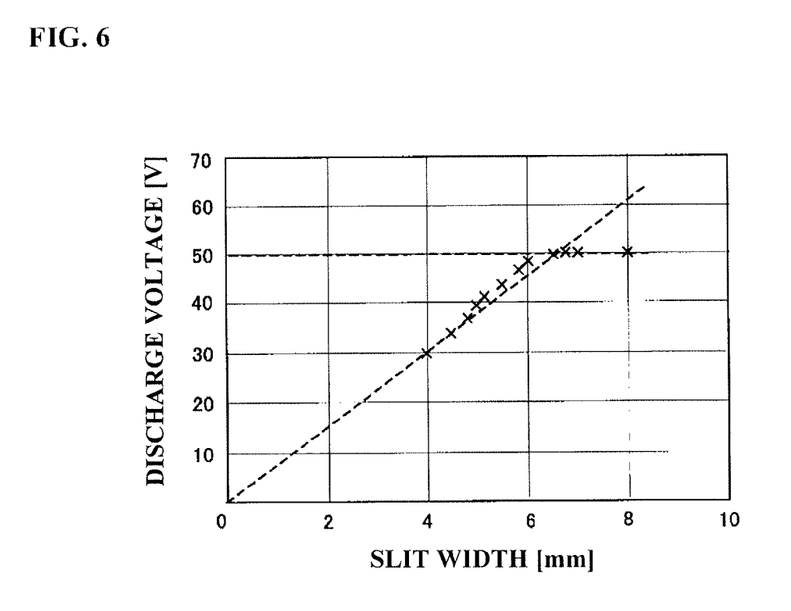
FIG. 6 is a graph showing the relationship between the slit width of a three-phase slit heater and discharge voltage.

FIG. 6 is a graph showing the result of an arching test to measure the phase voltages supplied to the terminal sections at the time of occurrence of arching between the susceptor and the three-phase slit heater. The test was conducted by changing the slit width S in the drawing of an optical fiber preform so as to have an outer diameter of 120 mm, with a drawing furnace in which the space D between the susceptor and the three-phase slit heater was 10 mm and the number N of the slits of the slit heater was 18 susceptor. Ar gas was used as the gas to be supplied into the furnace body.

In the case that the slit width is 5 mm or less, the relationship between the width of the slit and the discharge voltage at which arching occurs is represented by a linear function (in the dotted line portion), and it is found that the discharge voltage is proportional to the slit width. In the case that the slit width is 5 mm or more, the discharge voltage becomes slightly non-proportional thereto; in the case that the slit width is 6.7 mm or more, the discharge voltage hardly increases even if the slit width is made larger. The two threshold values (5 mm and 6.7 mm in this case) of the slit width vary depending on the space D between the susceptor and the slit heater, the number N of the slits, the type of gas, etc.; in the case that the slit heater is a three-phase slit heater and the gas supplied into the furnace is Ar gas, the slit widths S to be used as the threshold values respectively correspond to $9\times(D/N)$ and $12\times(D/N)$. Stable optical fiber drawing can be carried out by setting the slit widths to these threshold values or more.

The reason why the threshold values have the above-mentioned values can explained as described below.

FIG. 7(B) is a simulation view showing the resistance circuit of a three-phase slit heater. When it is assumed that resistance elements r are portions divided by the number N of the slits, a configuration in which resistors, each formed of a series connection of resistance elements $r\times(N/3)$, are connected in a three-phase delta connection is formed among the three terminal sections, that is, between 9a and 9c, between 9b and 9c, and between 9c and 9a. When it is assumed that the voltage to ground is V, the voltage applied between the respective two terminals is $\sqrt{3}$ V. Hence, since the voltage (potential difference) in the slit space across the two adjacent resistance elements has a divided voltage value for two resistance elements, the voltage is "$\sqrt{3}$ V×[2r/{r(N/3)}]=6 $\sqrt{3}$ V/N". When it is assumed that the slit width is S, the electric field (E2) in the slit space is $(6\sqrt{3}$ V/N)/S.

On the other hand, since the conductive member (including the susceptor) closest to the slit heater has zero potential, an electric field (E1) of V/D is generated between (in the space D between) the slit heater and conductive member closest thereto.

In order that the arching between the slit heater and the conductive member closest thereto is not affected by the structure of the slit, E1≥E2 may merely be established; in other words, V/D≤$(6\sqrt{3}$ V/N)/S→"S≥$6\sqrt{3}$ D/N" is obtained.

However, since power is supplied from a three-phase AC power source, the electric field (E1) between the slit heater and the conductive member is out of phase with the electric field (E2) in the slit space by π/3. Hence, in order that the electric field in the slit space is made smaller than the electric field generated between the slit heater and the conductive member at any phase state, it may merely be considered that $\sqrt{3}/2\times E1 \geq E2$ is established. In other words, "S≥12 D/N is obtained.

In the case that the electric field (E2) generated in the slit space is made smaller than the electric field (E1) generated between the slit heater and the conductive member in some part of a period, a certain level of effect is obtained. Since the electric field (E2) in the slit space becomes $\sqrt{3}/2$ in a certain period, when it is considered that E1≥$\sqrt{3}/2$×E2 is established, "S≥9 D/N" can be obtained.

Generally, the number N of the slits of the slit heater and the space D between the slit heater and the susceptor are determined beforehand as design values depending on the type of the optical fiber preform to be drawn, the specifications of the drawing furnace, etc. In the present invention, it is found that the occurrence of arching can be suppressed effectively by setting the slit width S to $8\times(D/N)$ or more in the case of the single-phase slit heater and, that the occurrence can also be suppressed effectively by setting the slit width S to $9\times(D/N)$ or more, preferably $12\times(D/N)$ or more, in the case of the three-phase slit heater.

Furthermore, in the case that He gas is used as the gas to be supplied into the furnace body, the threshold value of the voltage at which arching occurs can be raised. It is supposed that this is due to the fact that, in the case of Ar gas or $N_2$ gas, once arching occurs, the arching is apt to continue because of the small thermal conductivity of the gas, but in the case of He gas, the arching is difficult to continue because of the large thermal conductivity, of the gas. Moreover, it is also supposed that this is influenced by the fact that the degree of ionization of He gas is smaller than that of Ar gas or $N_2$ gas at high temperatures. However, since Ar gas and $N_2$ gas are considerably more inexpensive than He gas, it is advantageous in cost that optical fiber drawing is carried out using Ar gas or $N_2$ gas to the utmost extent.

DESCRIPTION OF REFERENCE NUMERALS AND SIGNS

1 ... optical fiber drawing furnace,
2 ... optical fiber preform,
2a ... optical fiber,
3 ... susceptor,
4 ... slit heater, 5 . . . insulator,
6 . . . furnace body,
7, 7a, 7b . . . slits,
8 . . . heating section,
9a to 9c . . . terminal sections,
10 . . . power supply section

The invention claimed is:

1. A glass preform heating furnace comprising:
   a susceptor to which a glass preform is supplied;
   a slit heater in which slits are cut in a cylindrical member enclosing the susceptor from the upper and lower ends of the cylindrical member alternately;
   an insulator enclosing the exterior of the slit heater; and
   a furnace body enclosing the susceptor, the slit heater, and the insulator,
   wherein
   a first space between the slit heater and the susceptor or between the slit heater and the conductive member closest to the slit heater forms a distance D, the maximum value of the electric field in the first space is E1, that the number of the slits in the slit heater is N, a slit width of the slit heater is S, and that the maximum value of the electric field in a second space formed by the slit is E2, the values of D, N and S are set so that $E1 \geq E2$ is established.

2. The glass preform heating furnace of claim 1, wherein the slit heater is a single-phase slit heater, and the slit width S of the single-phase slit heater is set to $8 \times (D/N)$ or more.

3. The glass preform heating furnace of claim 1, wherein the slit heater is a three-phase slit heater, and the slit width S of the three-phase slit heater is set to $9 \times (D/N)$ or more.

4. The glass preform heating furnace of claim 3, wherein the slit width S of the three-phase slit heater is set to $12 \times (D/N)$ or more.

5. The glass preform heating furnace of claim 1, wherein the slit width S of the slit heater is satisfied at least in the slits adjacent to the terminal sections of the slit heater.

6. The glass preform heating furnace of claim 1, wherein argon gas or nitrogen gas is supplied into the furnace body.

7. The glass preform heating furnace of claim 1, wherein the slit width S is in a range between 4 mm and 8 mm.

* * * * *